(12) United States Patent
Shikata et al.

(10) Patent No.: US 10,146,340 B2
(45) Date of Patent: Dec. 4, 2018

(54) INFORMATION PROCESSING SYSTEM, INFORMATION PROCESSING APPARATUS, NON-TRANSITORY STORAGE MEDIUM ENCODED WITH COMPUTER READABLE INFORMATION PROCESSING PROGRAM, AND INFORMATION PROCESSING METHOD

(71) Applicant: NINTENDO CO., LTD., Kyoto (JP)

(72) Inventors: Hiromasa Shikata, Kyoto (JP); Mari Shirakawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 457 days.

(21) Appl. No.: 14/841,976

(22) Filed: Sep. 1, 2015

(65) Prior Publication Data
US 2016/0349866 A1 Dec. 1, 2016

(30) Foreign Application Priority Data

Jun. 1, 2015 (JP) ................................ 2015-111317

(51) Int. Cl.
| | |
|---|---|
| *G06F 3/0354* | (2013.01) |
| *G06F 3/14* | (2006.01) |
| *A63F 13/26* | (2014.01) |
| *G09G 5/14* | (2006.01) |
| *A63F 13/2145* | (2014.01) |
| *A63F 13/795* | (2014.01) |

(Continued)

(52) U.S. Cl.
CPC ...... *G06F 3/03547* (2013.01); *A63F 13/2145* (2014.09); *A63F 13/26* (2014.09); *A63F 13/327* (2014.09); *A63F 13/795* (2014.09); *A63F 13/847* (2014.09); *A63F 13/92* (2014.09); *G06F 3/1438* (2013.01); *G06F 3/1454* (2013.01); *G09G 5/14* (2013.01); *G09G 2380/14* (2013.01)

(58) Field of Classification Search
CPC .................................................. G60F 3/03457
USPC ........................................................ 345/157
See application file for complete search history.

(56) References Cited

U.S. PATENT DOCUMENTS 8,587,546 B1 * 11/2013 El-Khoury ............ G06F 3/1431
345/173
2003/0036431 A1 2/2003 Futatsugi et al.
(Continued)

FOREIGN PATENT DOCUMENTS

JP 2002-78963 3/2002

*Primary Examiner* — Jason C Olson
(74) *Attorney, Agent, or Firm* — Nixon & Vanderhye, P.C.

(57) ABSTRACT

An information processing system including first and second information processing apparatuses capable of communicating with each other is provided. Each of the first and second information processing apparatuses includes an input portion which accepts an operation by a user and a display. The first information processing apparatus includes a first display control module which has, in response to a first input to the input portion, a first image corresponding to the first input displayed in a first manner of representation within a display area of the display of the first information processing apparatus and a second display control module which has, in response to a second input following the first input to the input portion, the first image displayed in a second manner of representation different from the first manner of representation within the display area of each of the first and second information processing apparatuses.

16 Claims, 15 Drawing Sheets

(51) Int. Cl.
  *A63F 13/92*   (2014.01)
  *A63F 13/847*  (2014.01)
  *A63F 13/327*  (2014.01)

(56) References Cited

U.S. PATENT DOCUMENTS

| | | | | |
|---|---|---|---|---|
| 2009/0164930 | A1* | 6/2009 | Chen | G06F 3/0412 |
| | | | | 715/769 |
| 2009/0278764 | A1* | 11/2009 | Kuwahara | G03B 29/00 |
| | | | | 345/1.3 |
| 2010/0188352 | A1* | 7/2010 | Ikeda | G06F 3/04883 |
| | | | | 345/173 |
| 2011/0302519 | A1* | 12/2011 | Fleizach | G06F 3/03547 |
| | | | | 715/773 |
| 2012/0040719 | A1* | 2/2012 | Lee | G06F 1/1626 |
| | | | | 455/557 |
| 2012/0072857 | A1* | 3/2012 | Kubo | G06F 1/1616 |
| | | | | 715/761 |
| 2013/0088434 | A1* | 4/2013 | Masuda | G06F 1/3262 |
| | | | | 345/173 |
| 2015/0302621 | A1* | 10/2015 | Liu | G06T 11/60 |
| | | | | 345/647 |

* cited by examiner

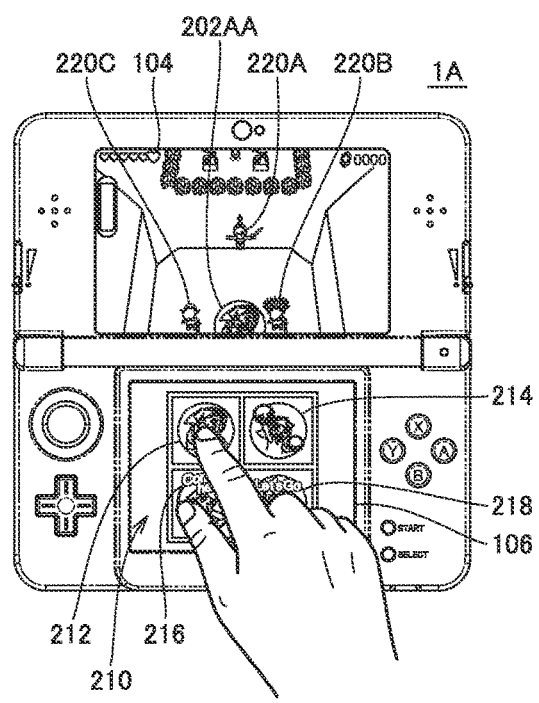
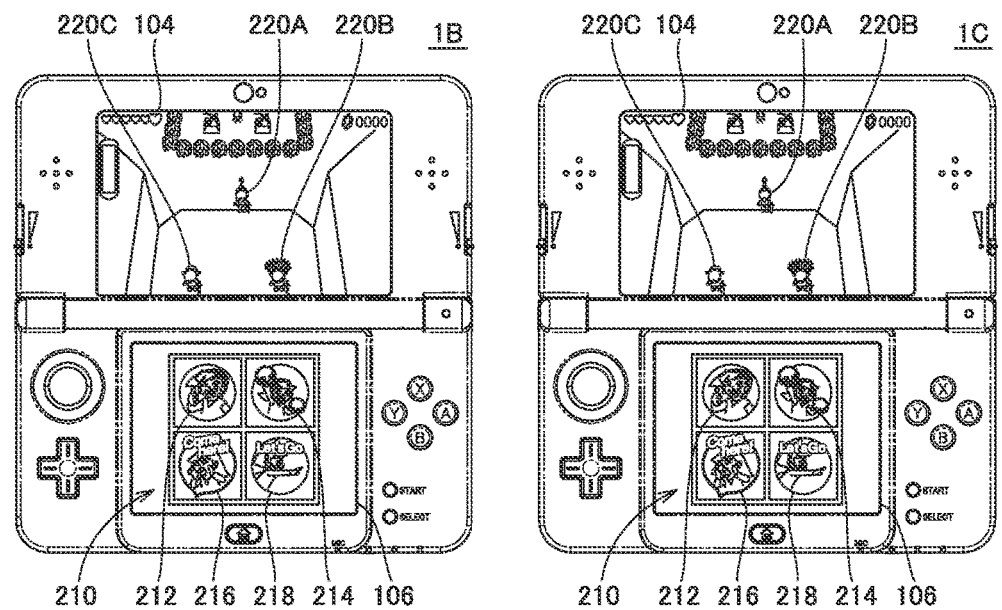
FIG.3

FIG.5
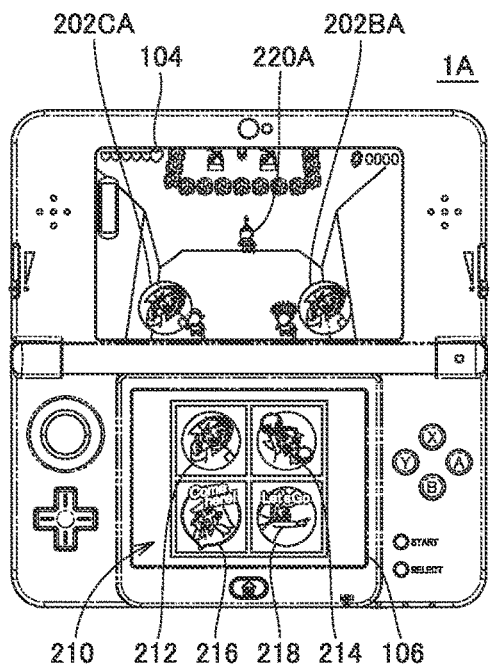
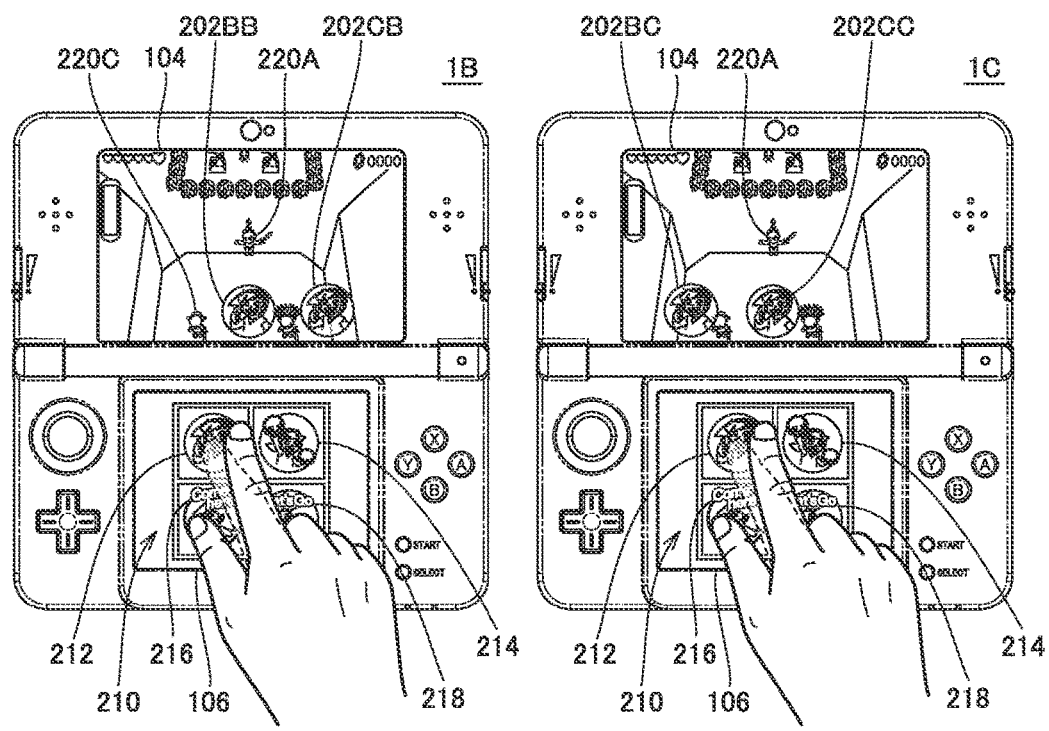

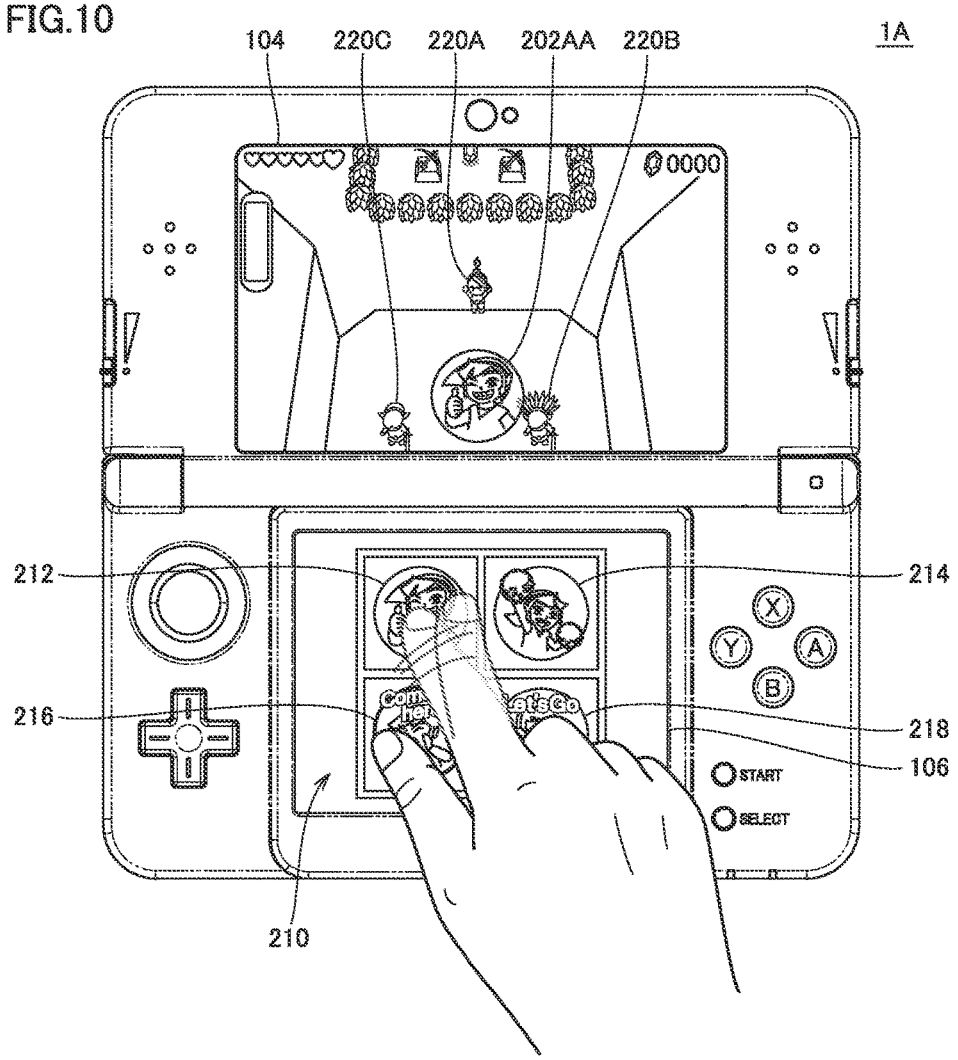

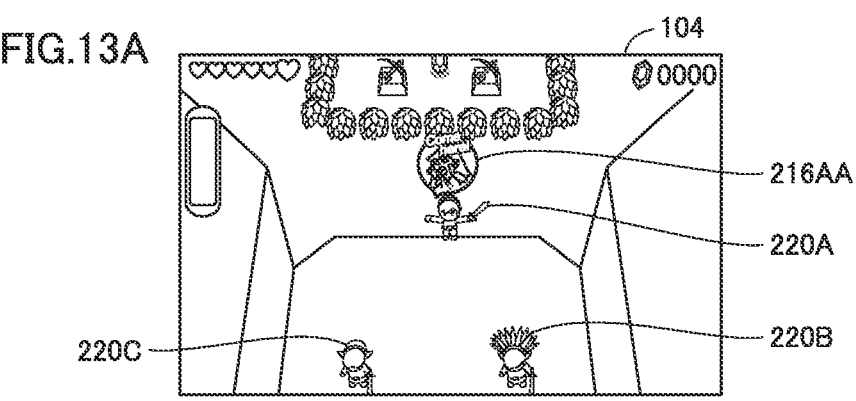
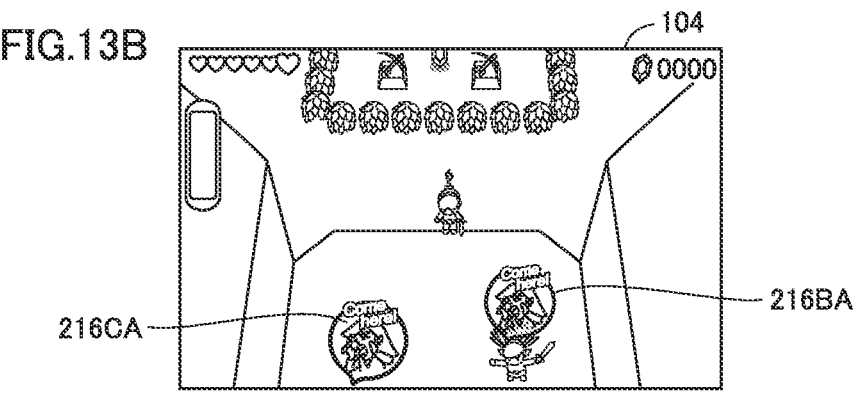

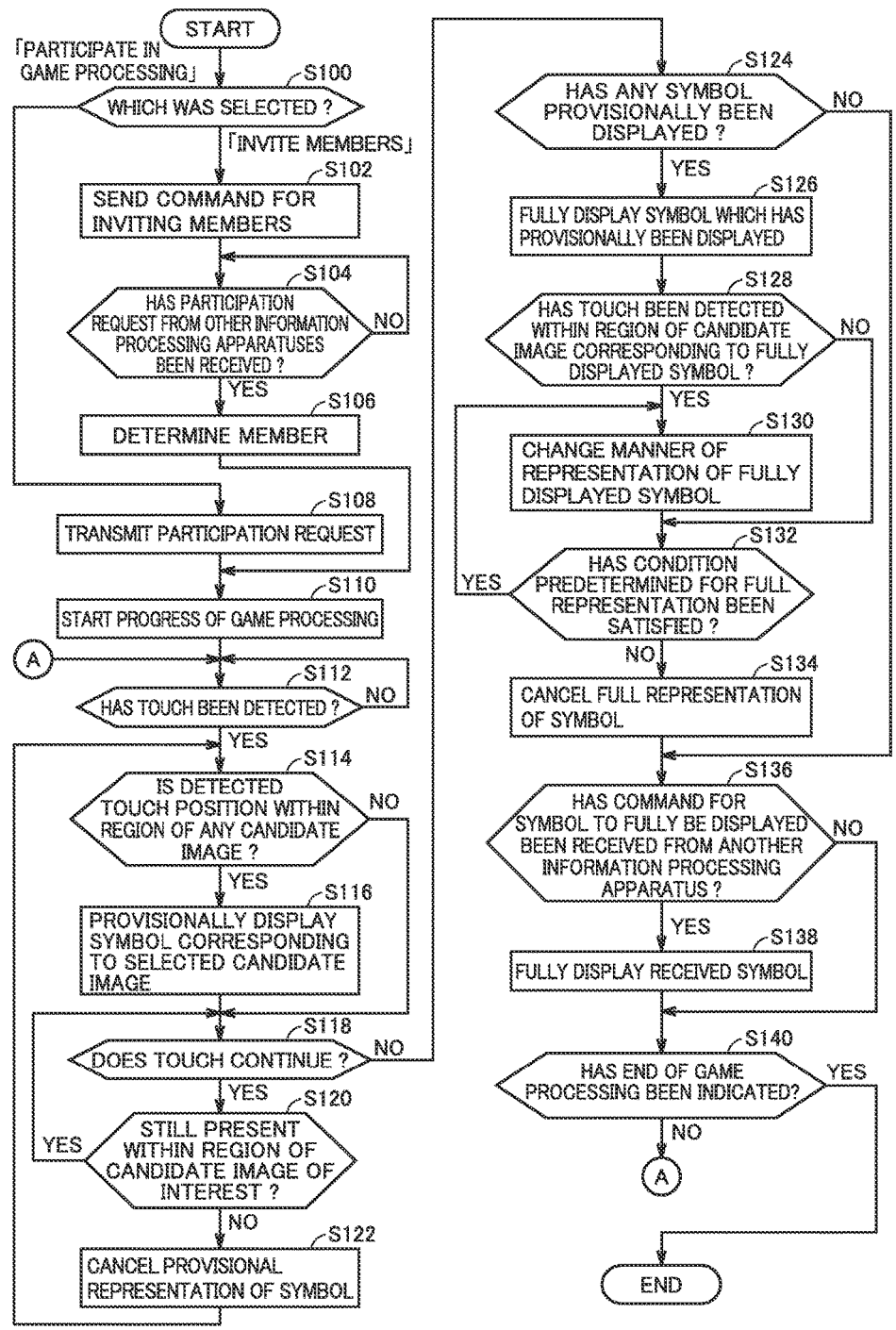

INFORMATION PROCESSING SYSTEM, INFORMATION PROCESSING APPARATUS, NON-TRANSITORY STORAGE MEDIUM ENCODED WITH COMPUTER READABLE INFORMATION PROCESSING PROGRAM, AND INFORMATION PROCESSING METHOD

This nonprovisional application is based on Japanese Patent Application No. 2015-111317 filed with the Japan Patent Office on Jun. 1, 2015, the entire contents of which are hereby incorporated by reference.

FIELD

An embodiment relates to an information processing system capable of communication with the use of an image, an information processing apparatus, a non-transitory storage medium encoded with a computer readable information processing program, and an information processing method.

BRIEF DESCRIPTION OF THE TECHNOLOGY

A configuration providing new communication means with the use of pictographs in a role playing game executed in an entertainment device has been known.

An expression method new in terms of convenience or expressive power, which is different from the conventional technique as described above, has been demanded.

An exemplary embodiment provides an information processing system including at least two information processing apparatuses. Each of the at least two information processing apparatuses includes an input portion which accepts an operation by a user and a display. A first information processing apparatus included in the at least two information processing apparatuses includes a first display control module which has, in response to a first input to the input portion, a first image corresponding to the first input displayed in a first manner of representation within a display area of the display of the first information processing apparatus and a second display control module which has, in response to a second input following the first input to the input portion, the first image displayed in a second manner of representation different from the first manner of representation within the display area of each of the at least two information processing apparatuses.

The first manner of representation may be lower in visibility by the user than the second manner of representation.

In the first manner of representation, a part of the first image may be displayed, and in the second manner of representation, the entirety of the first image may be displayed.

The second display control module has the displayed first image moved toward a central portion of the display area to change from the first manner of representation to the second manner of representation.

In the first manner of representation, the first image may be displayed translucently, and in the second manner of representation, the first image may be displayed opaquely.

The second display control module may have a second image corresponding to a third input to the input portion of a second information processing apparatus included in the at least two information processing apparatuses displayed in the display area, together with the first image, in response to an input from the second information processing apparatus.

In the display area of the display of the first information processing apparatus, an image corresponding to an input to the input portion of the first information processing apparatus and an image corresponding to an input to the input portion of the second information processing apparatus may be displayed, and in the display area of the display of the second information processing apparatus, an image corresponding to an input to the input portion of the first information processing apparatus and an image corresponding to an input to the input portion of the second information processing apparatus may be displayed.

The display may include an input area for accepting the first and second inputs, separately from the display area.

A plurality of candidate images may be displayed as aligned in the input area, and the input portion may determine as the first input, which candidate image has been selected from among the plurality of candidate images.

The first display control module may switch an image to be displayed in the display area, in accordance with the candidate image selected from among the plurality of candidate images, while the effective first input continues.

The input portion may include a pointing device.

The pointing device may include a touch panel, the first input may include a touch-on operation onto the touch panel, and the second input may include a touch-off operation from the touch panel.

The display area and the input area may be arranged in displays different from each other.

An exemplary embodiment provides an information processing apparatus which includes an input portion which accepts an operation by a user, a display, a communication portion for communicating with another information processing apparatus, a first display control module which has, in response to a first input to the input portion, a first image corresponding to the first input displayed in a first manner of representation within a display area of the display, and a second display control module which has, in response to a second input following the first input to the input portion, the first image displayed in a second manner of representation different from the first manner of representation within the display area and a display area of another information processing apparatus.

An exemplary embodiment provides a non-transitory storage medium encoded with a computer readable information processing program executed by an information processing apparatus. The information processing apparatus includes an input portion which accepts an operation by a user, a display, and a communication portion for communicating with another information processing apparatus. The information processing program causes the information processing apparatus to perform the steps of displaying, in response to a first input to the input portion, a first image corresponding to the first input in a first manner of representation within a display area of the display and displaying, in response to a second input following the first input to the input portion, the first image in a second manner of representation different from the first manner of representation within the display area and a display area of another information processing apparatus.

An exemplary embodiment provides an information processing method performed between at least two information processing apparatuses. Each of the at least two information processing apparatuses includes an input portion which accepts an operation by a user and a display. The information processing method includes the steps of displaying, in response to a first input to the input portion of the first information processing apparatus included in the at least two information processing apparatuses, a first image corresponding to the first input in a first manner of representation within a display area of the display of a first information processing apparatus and displaying, in response to a second input following the first input to the input portion of the first information processing apparatus, the first image in a second manner of representation different from the first manner of representation within the display area of each of the at least two information processing apparatuses.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIGS. 3 to 5 each show an exemplary illustrative non-limiting drawing illustrating one example of a state of execution of an application making use of communication among the information processing apparatuses according to the present embodiment.

FIGS. 10, 11A to 11C, 12A, and 12B show exemplary illustrative non-limiting drawings illustrating emphasized representation in the information processing apparatus according to the present embodiment.

FIGS. 13A and 13B show exemplary illustrative non-limiting drawings illustrating a display position of a symbol in the information processing apparatus according to the present embodiment.

FIG. 15 shows an exemplary illustrative non-limiting drawing illustrating a flowchart showing a processing procedure in the information processing apparatus according to the present embodiment.

DETAILED DESCRIPTION OF NON-LIMITING EXAMPLE EMBODIMENTS

Figure 1:
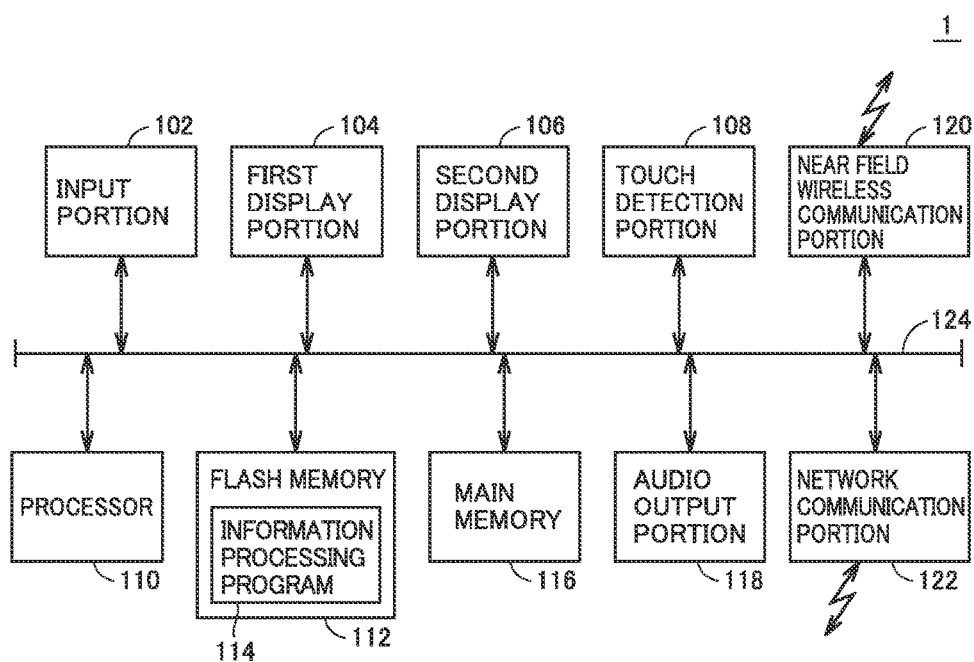
FIG. 1 shows an exemplary illustrative non-limiting drawing illustrating a configuration example of an information processing apparatus according to the present embodiment.

The present embodiment will be described in detail with reference to the drawings. The same or corresponding elements in the drawings have the same reference characters allotted and description thereof will not be repeated.

[A. Configuration of Information Processing Apparatus]

A configuration of an information processing apparatus according to the present embodiment will initially be described. The information processing apparatus may be, for example, a portable (also referred to as mobile) device such as a portable game device, a portable telephone, or a smartphone, a stationary device such as a personal computer or a home game console, or a large apparatus such as an arcade game machine. Namely, any computer can be adopted as the information processing apparatus according to the present embodiment.

Referring to FIG. 1, an information processing apparatus 1 includes, as components thereof, an input portion 102, a first display portion 104, a second display portion 106, a touch detection portion 108, a processor 110, a flash memory 112, a main memory 116, an audio output portion 118, a near field wireless communication portion 120, and a network communication portion 122. These components are configured to be able to communicate with one another through a bus 124.

Input portion 102 is implemented by a key, a button, a cross-shaped key, or an analog stick, and accepts an operation by a user. First display portion 104 and second display portion 106 display an image generated through information processing which will be described later. Though a configuration in which two display portions are mounted for a variety of funs is exemplified in the present embodiment, a configuration in which only a single display portion is mounted may be applicable. Touch detection portion 108 is electrically connected to a touch panel (not shown) representing one example of a pointing device arranged on a surface of any display portion and detects a touch operation by the user.

Processor 110 is a processing entity which can execute program instructions, such as a central processing unit (CPU), a micro processing unit (MPU), or a graphics processing unit (GPU). Flash memory 112 is any storage device (storage medium) which processor 110 can access and stores an information processing program 114. Processor 110 reads and executes information processing program 114 stored in flash memory 112.

Main memory 116 is implemented by a non-volatile memory such as a dynamic random access memory (DRAM), and holds various types of data necessary for processor 110 to execute information processing program 114. Information processing program 114 may include a program module which performs display processing, communication processing, or input processing, in addition to a program module for executing an application as will be described later.

Audio output portion 118 drives a speaker (not shown) arranged in a housing of information processing apparatus 1 and outputs voice and sound to a user.

Near field wireless communication portion 120 is a communication module which exchanges data with another information processing apparatus 1 which is present at a relatively near position. Near field wireless communication portion 120 can be implemented, for example, with infrared communication, Bluetooth®, or wireless local area network (LAN). Network communication portion 122 is a communication module which exchanges data with a server device or another information processing apparatus 1 through the Internet. Network communication portion 122 can be implemented, for example, with wireless LAN or wired LAN. Any of near field wireless communication portion 120 and network communication portion 122 can be made use of for communication with another information processing apparatus 1.

Though FIG. 1 shows a configuration example in which flash memory 112 contained in information processing apparatus 1 stores information processing program 114, a hard disk may be employed instead of flash memory 112. Alternatively, a storage medium which can be attached to and removed from information processing apparatus 1 such as an optical disc or a magnetic cartridge may be employed. An information processing system (a game system by way of example) may be configured based on combination with a storage medium separate from information processing apparatus 1.

Information processing apparatus 1 may be configured based on combination of a plurality of apparatuses. For example, information processing apparatus 1 may be configured in such a manner that an apparatus having near field wireless communication portion 120 and network communication portion 122 is removably connected to an apparatus having processor 110 and main memory 116. Information processing apparatus 1 may include a main body apparatus having processor 110 and an apparatus having at least some of input portion 102, first display portion 104, and second display portion 106, which are separate from each other. Instead of first display portion 104 or second display portion 106, information processing apparatus 1 may be configured with a television set in place of a display portion.

In another embodiment, at least a part of information processing performed in information processing apparatus 1 may be performed as distributed among a plurality of apparatuses capable of communicating over a network (a wide area network and/or a local network).

Information processing program 114 executed by information processing apparatus 1 may be installed in advance in information processing apparatus 1 or downloaded from a server device.

[B. Overview]

Overview of processing supporting communication among users, which is performed in information processing apparatus 1 according to the present embodiment, will now be described.

Figure 2:
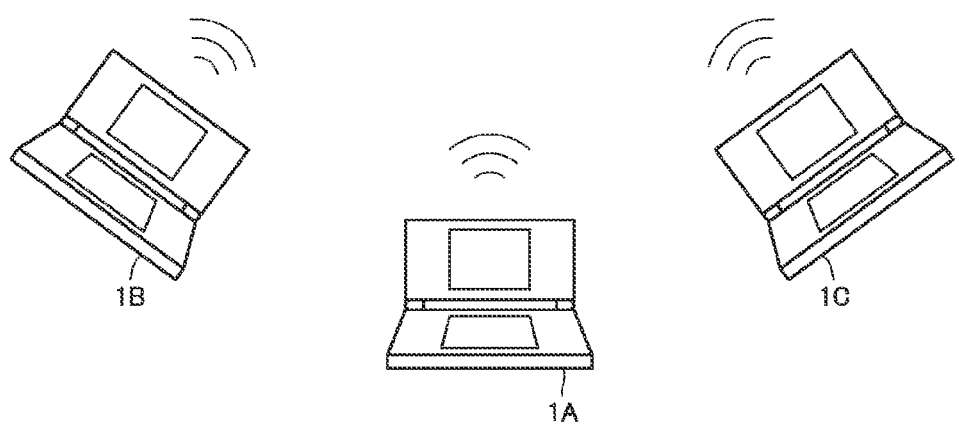
FIG. 2 shows an exemplary illustrative non-limiting drawing illustrating an example in which a plurality of information processing apparatuses according to the present embodiment communicate with one another.

FIG. 2 shows a state that three information processing apparatuses 1 (information processing apparatuses 1A to 1C) communicate with one another. Namely, one example of an information processing system SYS includes at least two information processing apparatuses 1A to 1C which can communicate with one another, and communication can be established among users of information processing apparatuses 1A to 1C.

When a specific information processing apparatus 1 is mentioned in the description below, such denotation as "information processing apparatus 1A", "information processing apparatus 1B", and "information processing apparatus 1C" is given.

When the users are located at positions proximate to one another, near field wireless communication portion 120 (FIG. 1) may be used to communicate among information processing apparatuses 1, or information processing apparatuses 1 held by remote users can also communicate through the Internet through network communication portion 122 (FIG. 1). In addition, a plurality of information processing apparatuses 1 can communicate with the use of near field wireless communication portion 120 (FIG. 1), and communication including yet another information processing apparatus 1 can also be established through network communication portion 122 (FIG. 1). A function to communicate among information processing apparatuses 1 may be achieved by any method other than the method described above.

The plurality of information processing apparatuses 1 do not have to be identical in model or apparatus, and any information processing apparatus 1 may be combined, so long as communication can be established in information processing system SYS.

Figure 4:
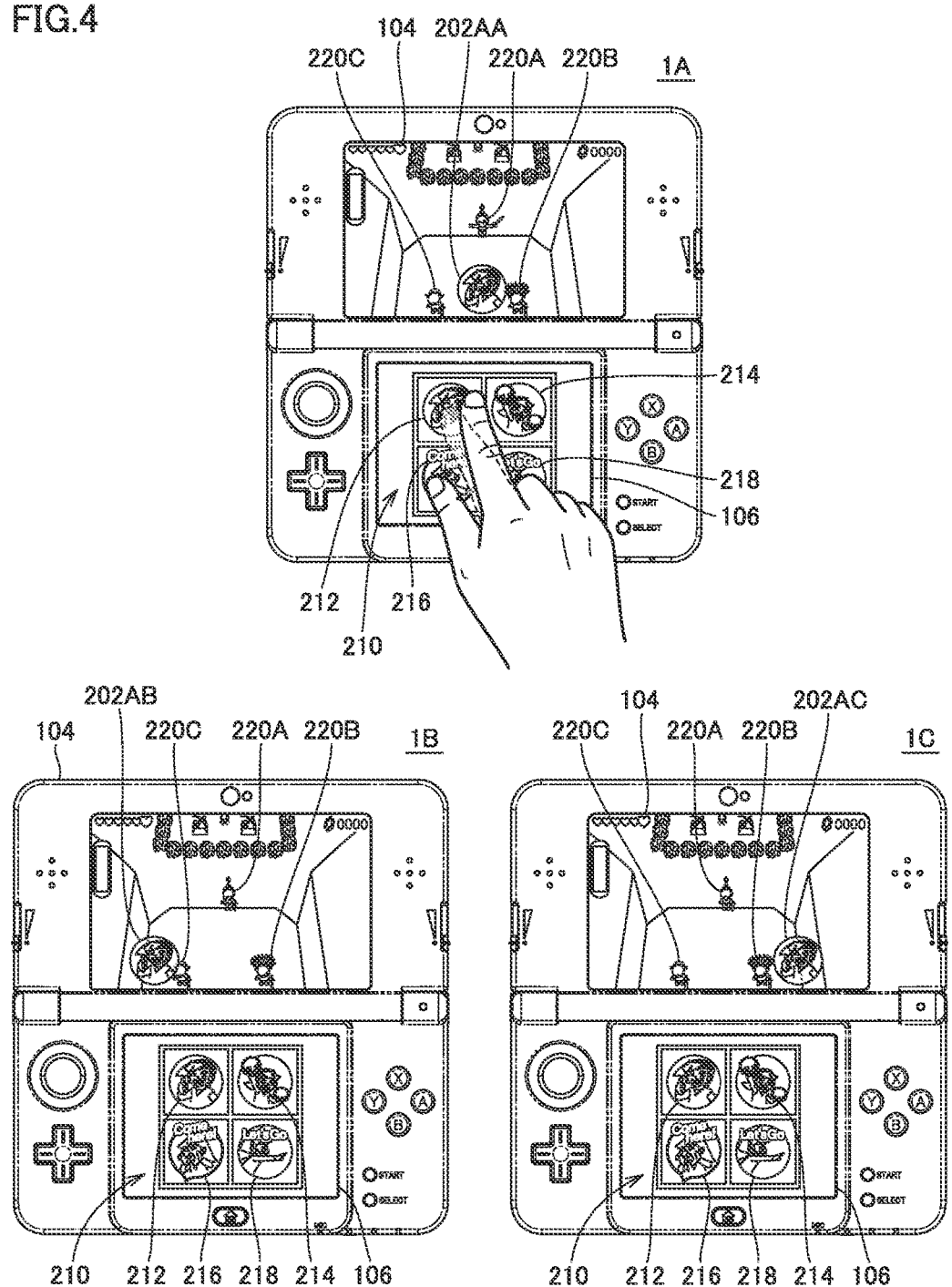

FIGS. 3 to 5 each show an example in which game processing proceeds as users of information processing apparatuses 1A to 1C operate respective characters within the same virtual game field. As game processing, for example, a role playing game in which a plurality of characters go through an adventure in cooperation with one another, an action game, or an action role playing game is assumed.

Referring to FIG. 3, first display portion 104 of each of information processing apparatuses 1A to 1C substantially corresponds to a display area of the display portion, and second display portion 106 of each of information processing apparatuses 1A to 1C corresponds to an input area for accepting various operations by a user as will be described later.

More specifically, a common virtual game field is displayed in first display portion 104 (display area) of each of information processing apparatuses 1A to 1C, and characters 220A to 220C operated by respective users are displayed in the virtual game field. In response to an operation by the user of each of information processing apparatuses 1A to 1C, a display position or an action of characters 220A to 220C is varied. As the game proceeds, an image selection region 210 in which selection from among a plurality of images can be made is displayed in second display portion 106 (input area) of each of information processing apparatuses 1A to 1C.

In the present embodiment, first display portion 104 (display area) of each of information processing apparatuses 1A to 1C and second display portion 106 (input area) of each of information processing apparatuses 1A to 1C are arranged in displays (display devices) different from each other. When a single display device (a display portion) is employed, however, a display area and an input area may be formed based on division of a region.

In image selection region 210, a plurality of images are arranged under a prescribed rule. An image included in image selection region 210 is used for the purpose of communication with another user (typically, for the purpose of conveying a user's own intention to another user who participates in the same game processing). For the sake of convenience of description, these images are also referred to as "symbols".

The "symbol" herein refers to a concept encompassing images used for communication with other users, and so long as the symbol can visually be recognized, it may be anything such as graphics, a pattern, or a color. Typically, the "symbol" may include a letter or a character.

In second display portion 106 (input area), symbols which are a plurality of candidate images are displayed as aligned. Namely, four candidate images 212, 214, 216, and 218 are arranged in image selection region 210 displayed in second display portion 106. A sensing member is arranged on a surface of second display portion 106 and configured to be able to detect a touch operation by a user onto second display portion 106. Information processing apparatus 1 determines, as its input function, which candidate image among the plurality of candidate images (candidate images 212, 214, 216, and 218) has been selected. More specifically, when a user performs a touch operation onto second display portion 106 and a touch corresponding to any symbol within image selection region 210 is detected, a symbol corresponding to the corresponding touch is displayed on first display portion 104.

In the present embodiment, a state of a symbol displayed in first display portion 104 includes at least two of provisional representation representing a first manner of representation and a full representation representing a second manner of representation different from the first manner of representation.

"Full representation" herein intends a manner of representation in which substantially the entirety of a symbol of interest can be presented to a user, and "provisional representation" intends a manner of representation lower in degree of ability to present the meaning of the symbol to a user than "full representation". In other words, "full representation" allows presentation of a symbol of interest as it is to a user, whereas "provisional representation" allows presentation of the symbol to a user to such an extent as allowing identification of the symbol.

By way of example, "provisional representation" (the first manner of representation) is lower in visibility by a user than "full representation" (the second manner of representation). Namely, "provisional representation" is a manner of representation lower in viewability than "full representation". To the contrary, "full representation" (the second manner of representation) is a manner of representation attracting more attention in first display portion 104 (the display area) than "provisional representation" (the first manner of representation).

FIG. 3 shows a state that a user touches candidate image 212 in image selection region 210 displayed in second display portion 106 of information processing apparatus 1A so that a symbol 202AA is provisionally displayed in first display portion 104 of information processing apparatus 1A. In this state of provisional representation, provisionally displayed symbol 202AA is not displayed on other information processing apparatuses 1B and 1C, and displayed only on information processing apparatus 1A in which the touch operation has been performed.

Referring to FIG. 4, when the user subsequently performs a prescribed operation onto second display portion 106 of information processing apparatus 1A, a state of display of symbol 202AA changes from provisional representation to full representation. Namely, symbol 202AA corresponding to candidate image 212 in image selection region 210 is fully displayed in first display portion 104.

When symbol 202AA is fully displayed in first display portion 104 of information processing apparatus 1A, symbols 202AB and 202AC corresponding to symbol 202AA are displayed in first display portions 104 of information processing apparatuses 1B and 1C, respectively. Here, each of symbols 202AB and 202AC may appear at a prescribed position as sliding out of a screen (displaying with movement).

Specifically, symbol 202AB corresponding to symbol 202AA displayed in first display portion 104 of information processing apparatus 1A is displayed in first display portion 104 of information processing apparatus 1B. Here, symbol 202AB is displayed in a lower left portion rather than a lower central portion of first display portion 104 of information processing apparatus 1B.

Similarly, symbol 202AC corresponding to symbol 202AA displayed in first display portion 104 of information processing apparatus 1A is displayed in first display portion 104 of information processing apparatus 1C. Here, symbol 202AC is displayed in a lower right portion rather than a lower central portion of first display portion 104 of information processing apparatus 1C.

A position of a symbol displayed in first display portions 104 of information processing apparatuses 1B and 1C in response to an operation by a user of information processing apparatus 1A can arbitrarily be designed. In order to instantaneously determine from which information processing apparatus 1 (that is, from which user) the symbol originates, however, a display position may be predetermined. For example, in information processing apparatus 1B, a symbol displayed in response to an operation by a user onto information processing apparatus 1B itself may be displayed in the lower central portion of first display portion 104, a symbol displayed in response to an operation by a user onto information processing apparatus 1A may be displayed in the lower right portion of first display portion 104, and a symbol displayed in response to an operation by a user onto information processing apparatus 1C may be displayed in the lower left portion of first display portion 104.

Furthermore, in order to know at a glance onto which information processing apparatus 1 an operation by a user has been performed, a label may be displayed or a color-coded display may be provided in association with a position where each symbol is displayed.

Alternatively, a manner of representation (a color, a shape, or a size) of a displayed symbol may be differed so that onto which information processing apparatus 1 an operation by a user has been performed for display can be known at a glance.

FIG. 5 shows a state that users have operated information processing apparatus 1B and information processing apparatus 1C, respectively.

Specifically, symbols 202BA and 202CA are displayed (fully displayed) in first display portion 104 of information processing apparatus 1A. Symbol 202BA is a symbol fully displayed as a user performs a touch operation onto image selection region 210 of information processing apparatus 1B, and symbol 202CA is a symbol fully displayed as a user performs a touch operation onto image selection region 210 of information processing apparatus 1C.

When combination of alphabets is employed as a reference sign for a symbol for the sake of convenience of description, the first alphabet indicates information processing apparatus 1 onto which an operation by a user has been performed, and the second alphabet indicates information processing apparatus 1 on which a symbol is displayed. For example, "symbol 202BA" refers to a symbol displayed in response to an operation by a user onto information processing apparatus 1B and displayed on information processing apparatus 1A, which is applicable to examples that follow.

Similarly, symbols 202BB and 202CB are displayed (fully displayed) in first display portion 104 of information processing apparatus 1B. Symbol 202BB is a symbol fully displayed as the user performs a touch operation onto image selection region 210 of information processing apparatus 1B, and symbol 202CB is a symbol fully displayed as the user performs a touch operation onto image selection region 210 of information processing apparatus 1C.

Symbols 202CC and 202BC are displayed (fully displayed) in first display portion 104 of information processing apparatus 1C. Symbol 202CC is a symbol fully displayed as the user performs a touch operation onto image selection region 210 of information processing apparatus 1C, and symbol 202BC is a symbol fully displayed as the user performs a touch operation onto image selection region 210 of information processing apparatus 1B.

As set forth above, information processing apparatus 1A has a provisional representation control function to provisionally display (the first manner of representation) a symbol (a first image) corresponding to an operation by a user in first display portion (within the display area) of information processing apparatus 1A in response to an operation by the user (a first input) onto the touch panel (an input device) arranged in second display portion 106 (an input area). In addition, information processing apparatus 1A has a full representation control function to display the symbol (the first image) in full representation (a second manner of representation) different from provisional representation in first display portion 104 (within the display area) of each of information processing apparatuses 1A to 1C in response to another operation by the user (a second input) following the first operation by the user (the first input) onto the touch panel (the input device) arranged in second display portion 106 (the input area).

The full representation control function further has first display portion 104 (the display area) display symbols 202BA and 202CA (a second image) corresponding to an operation by the user (a third input) onto the touch panels (the input devices) of other information processing apparatuses 1B and 1C, together with symbol 202AA, in response to inputs from other information processing apparatuses 1B and 1C. Information processing apparatuses 1B and 1C each also have the provisional representation control function and the full representation control function similarly to information processing apparatus 1A.

Namely, an image corresponding to an input onto the touch panel (input device) of information processing apparatus 1A and an image corresponding to an input onto the touch panel (input device) of information processing apparatus 1B or 1C are displayed in first display portion 104 (within the display area) of information processing apparatus 1A, and an image corresponding to an input onto the touch panel (input device) of information processing apparatus 1B or 1C and an image corresponding to an input onto the touch panel (input device) of information processing apparatus 1A are displayed in first display portion 104 (within the display area) of information processing apparatus 1B or 1C.

As described above, information processing apparatus 1 according to the present embodiment can realize more expressive communication as shown in FIGS. 3 to 5 by exchanging data with other information processing apparatuses 1.

[C. Display Processing in Provisional Representation and Full Representation]

Display processing in provisional representation and full representation in information processing apparatus 1 according to the present embodiment will now be described.

Figure 6:
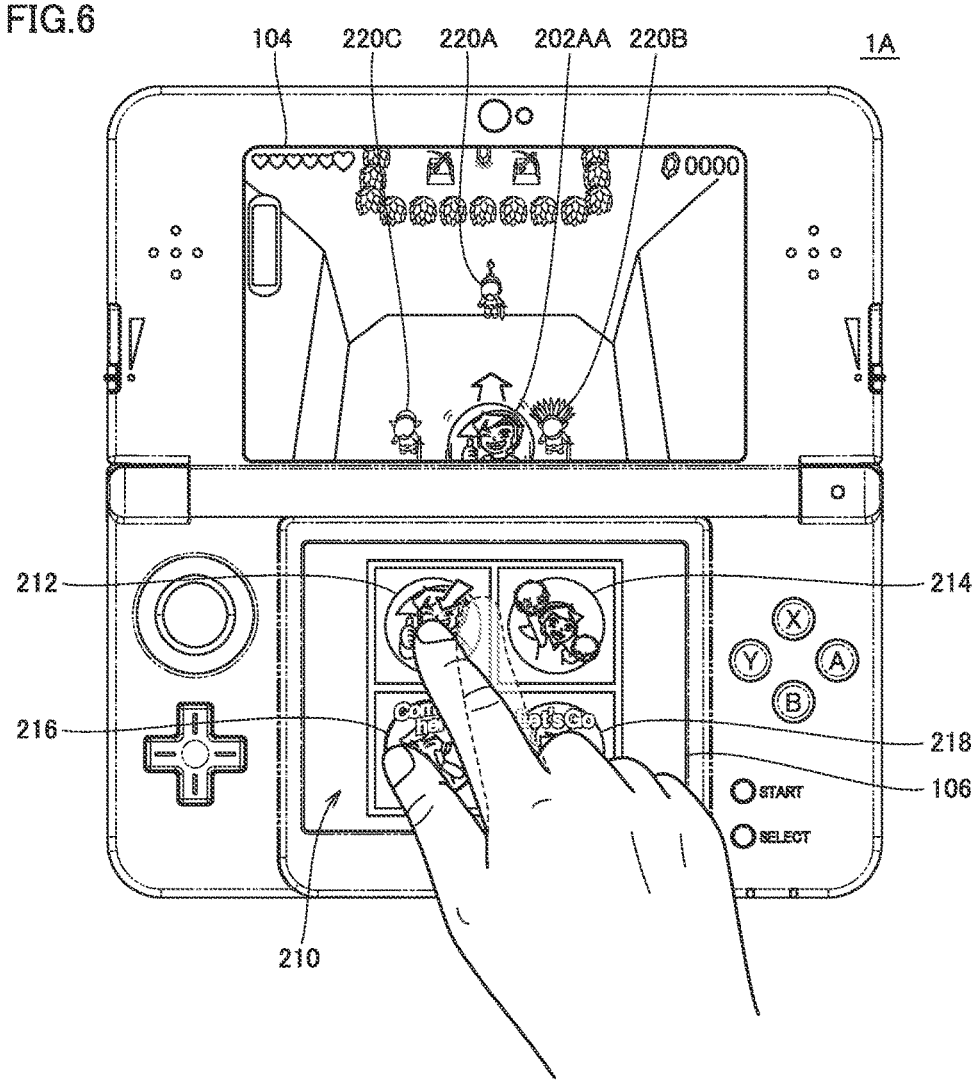
FIGS. 6 to 9 show exemplary illustrative non-limiting drawings illustrating display processing for provisional representation and full representation in the information processing apparatus according to the present embodiment.

Referring to FIG. 6, image selection region 210 including a plurality of symbols is displayed in second display portion 106 of information processing apparatus 1A. As a user touches any symbol within image selection region 210 (touch-on), symbol 202AA is provisionally displayed in first display portion 104 of information processing apparatus 1A. Namely, an operation by the user to select symbol 202AA to provisionally be displayed includes a touch-on operation onto the touch panel. Symbol 202AA is displayed in the lower central portion of first display portion 104 with such a display effect as being moved upward from the lower end of a screen (in other words, sliding in). Symbol 202AA shown in FIG. 6 is in a provisionally displayed state.

Figure 7:
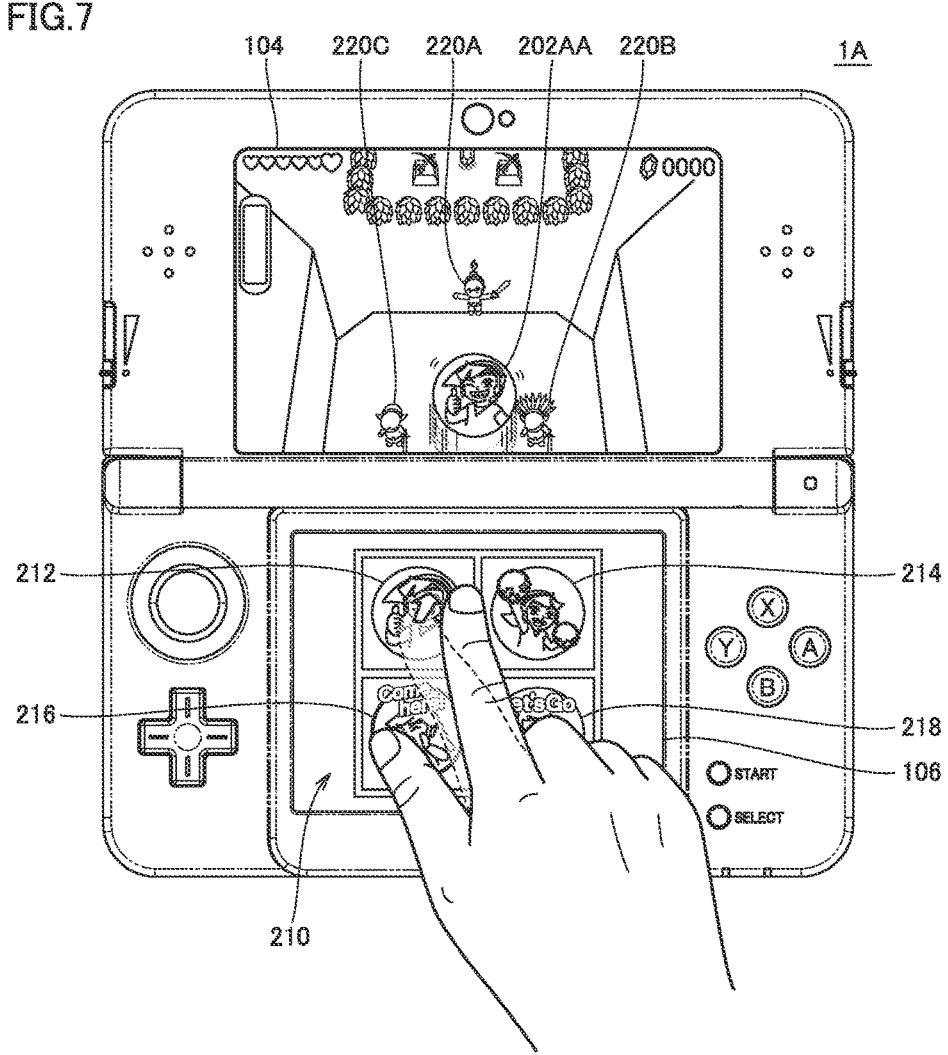

Referring to FIG. 7, as the touch operation onto second display portion 106 of information processing apparatus 1A is canceled (touch-off), provisionally displayed symbol 202AA is fully displayed. Namely, an operation by the user for fully displaying symbol 202AA includes a touch-off operation from the touch panel.

In full representation of symbol 202AA, a display effect as moving upward over the screen (sliding in) may be provided. Namely, the full representation control function of information processing apparatus 1A has the displayed symbol 202AA moved toward the central portion of first display portion 104 (within the display area) to change from provisional representation to full representation.

Voice and sound may be output from audio output portion 118 (FIG. 1) in response to an operation by the user for indicating display of a symbol. Here, voice and sound is also preferably differed in accordance with a type of a symbol.

Provisional representation (the first manner of representation) is lower in visibility by a user than full representation (the second manner of representation), and FIGS. 6 and 7 show an example in which a part of a symbol is displayed in provisional representation (the first manner of representation) and the entirety of the symbol is displayed in full representation (the second manner of representation).

As the user touches another symbol (touch-on) within image selection region 210 while the touch operation onto second display portion 106 of information processing apparatus 1A continues, the symbol corresponding to the newly touched symbol is displayed in first display portion 104 of information processing apparatus 1A. This display processing will be described with reference to FIGS. 6, 8, and 9.

Figure 8:
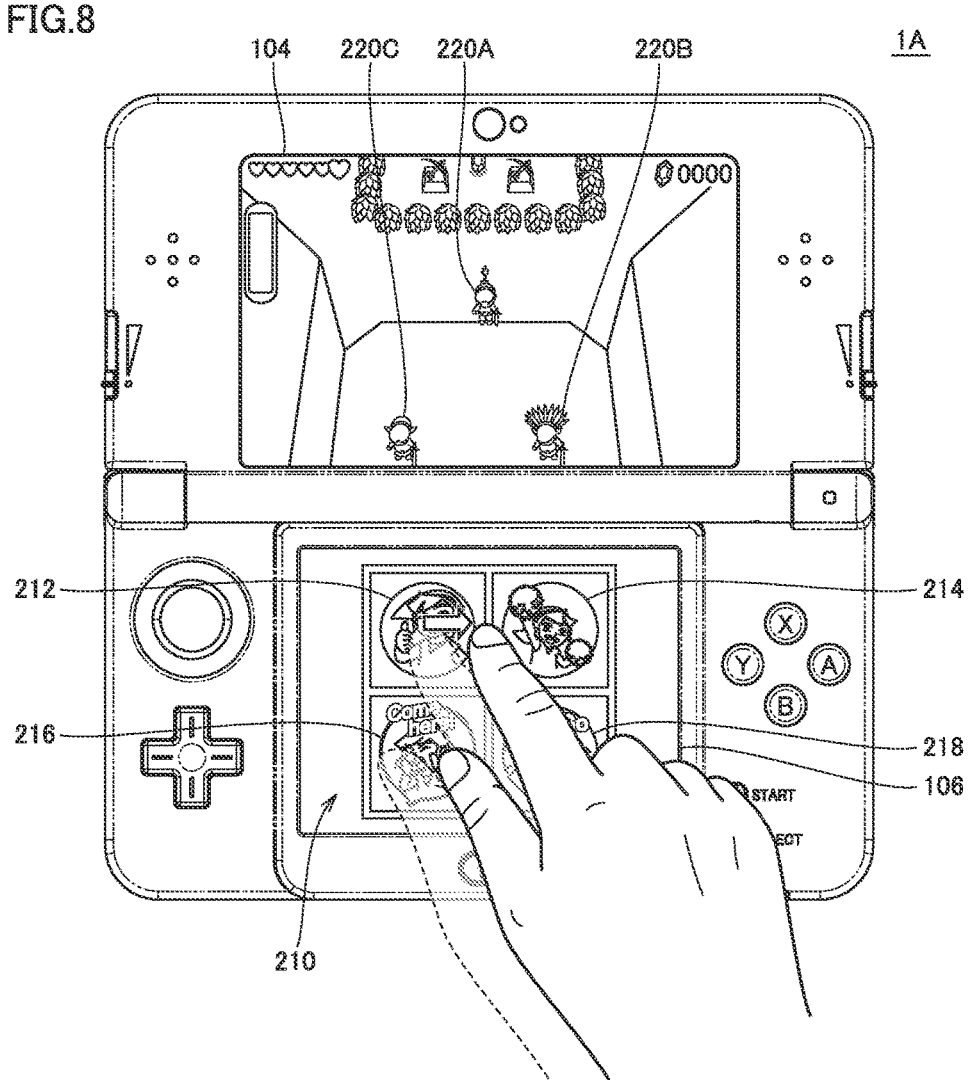

When the user moves his/her finger to the outside of candidate image 212 within image selection region 210 while the touch operation onto second display portion 106 of information processing apparatus 1A continues from the state that symbol 202AA is provisionally displayed in first display portion 104 of information processing apparatus 1A (see FIG. 6), provisionally displayed symbol 202AA once disappears at the time point when a touch position is outside the region of candidate image 212 (see FIG. 8). When the touch position has reached the inside of a region of another candidate image 214 as the user moves his/her finger, a symbol 204AA corresponding to another candidate image 214 is displayed in first display portion 104 (see FIG. 9).

Thus, the provisional representation control function of information processing apparatus 1 allows switching between symbols displayed in first display portion 104 (the display area) in accordance with a candidate image selected from among the plurality of candidate images 212, 214, 216, and 218 while an operation by the user (the first input) onto the touch panel (input device) continues.

Figure 9:
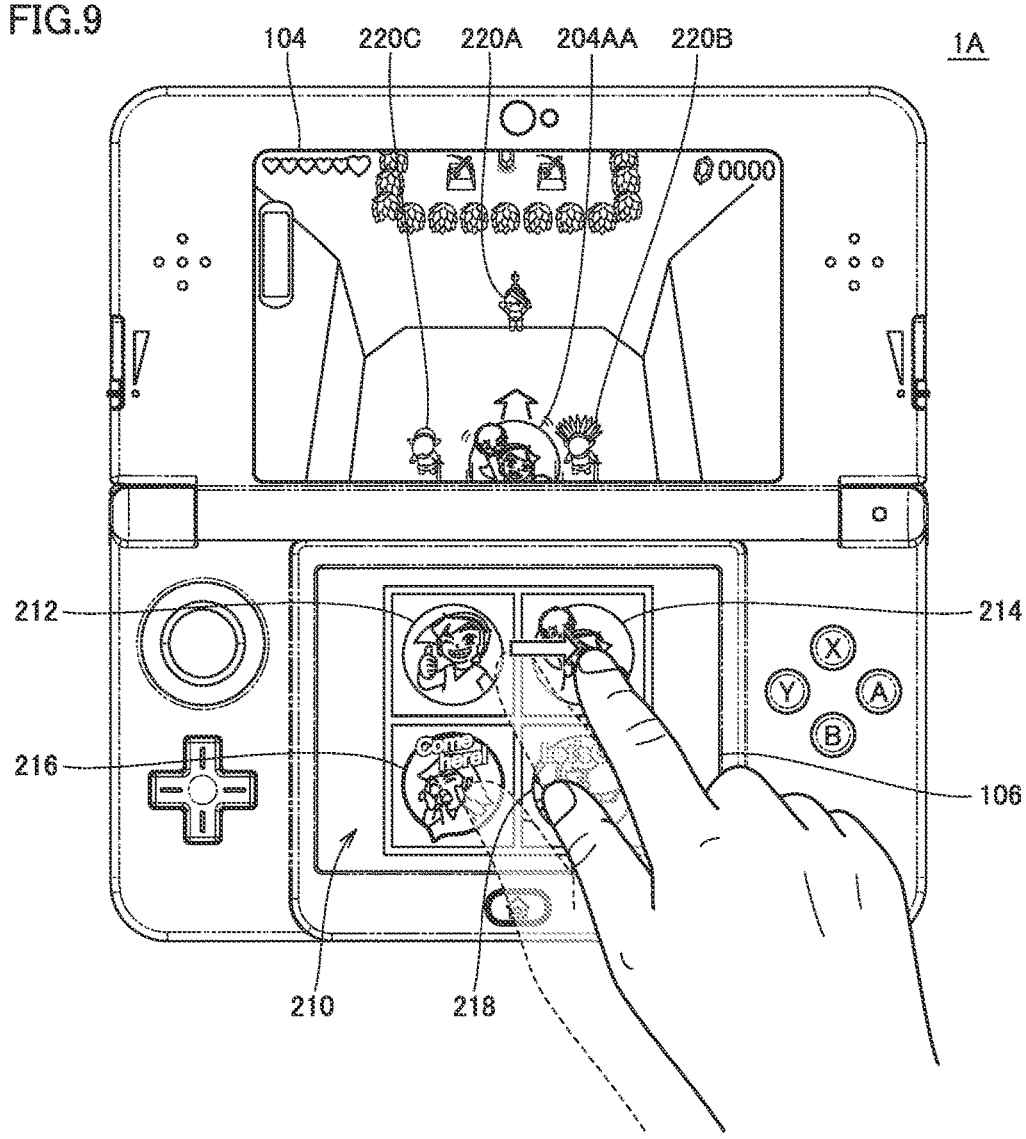

When there is no outside region between candidate images, a symbol may once disappear at the time of switching as in FIG. 8 and then immediately appear as in FIG. 9. Alternatively, switching between half-displayed symbols may simply be made, without a symbol once disappearing as in FIG. 8.

Symbol 204AA may also be displayed in the lower central portion of first display portion 104 with a display effect as moving upward from the lower end of the screen (sliding in). Symbol 204AA shown in FIG. 9 is in a provisionally displayed state. When the touch operation onto second display portion 106 of information processing apparatus 1A is canceled (touch-off) while symbol 204AA shown in FIG. 9 is displayed, provisionally displayed symbol 204AA is changed to full representation. In this change to full representation as well, a display effect as moving upward over the screen (sliding in) may be provided.

In response to such an operation by the user onto image selection region 210, a symbol arbitrarily selected by a user is provisionally displayed and fully displayed in first display portion 104.

Though processing for provisional representation and full representation in response to an operation by a user onto the touch panel representing one example of the pointing device has been exemplified in the description above, limitation thereto is not intended. An analog stick or a pointing stick may be employed as the pointing device without being limited the touch panel. In this case, an operation to input provisional representation and full representation may be defined in correspondence with start of operation of the pointing device and cancellation of the operation thereof, respectively. Alternatively, an operation to input provisional representation and full representation may be defined in correspondence with combination of an operation onto the pointing device and another operation of a button.

Though FIGS. 6 and 7 have adopted a manner of representation in which a part of a symbol is displayed as provisional representation and a manner of representation in which the entirety of the symbol is displayed as full representation, any manner of representation can be adopted without being limited thereto.

For example, a manner of representation in which a symbol is translucently displayed may be adopted as provisional representation and a manner of representation in which a symbol is displayed opaquely may be adopted as full representation. Namely, a user can visually recognize a content of a virtual game field displayed in the display area even while a symbol is provisionally displayed. When the symbol is fully displayed, however, the symbol is displayed in such a manner of representation as covering the virtual game field, and hence a content of the virtual game field in a portion where the symbol is present cannot visually be recognized. The user can know which of provisional representation and full representation is provided at a glance, based on switching between transparent representation and opaque representation as such.

Alternatively, a manner of representation in which a symbol is displayed in a reduced size may be adopted as provisional representation and a manner of representation in which the symbol is displayed in its original size (a size greater than in provisional representation) may be adopted as full representation. Namely, a symbol displayed in provisional representation is smaller than the symbol displayed in full representation.

Alternatively, a manner of representation in which a symbol is monochromatically displayed may be adopted as provisional representation, and a manner of representation in which the symbol is displayed in its original colors (colored) may be adopted as full representation. Namely, a symbol displayed in provisional representation is smaller in number of colors than a symbol displayed in full representation.

Furthermore, switching of a manner of representation between provisional representation and full representation may be implemented based on combination as appropriate of switching of display between the entirety and a part, switching of display between transparent representation and opaque representation, switching between display sizes, or switching between monochromatic representation and colored representation.

Switching between a provisionally displayed image and a fully displayed image may be made. In this case, switching between shapes of images (for example, switching from a triangle to a rectangle) may be made.

[D. Display Processing in Emphasized Representation]

Display processing in emphasized representation in information processing apparatus 1 according to the present embodiment will now be described.

Referring to FIG. 10, symbol 202AA is fully displayed by canceling a touch operation onto second display portion 106 of information processing apparatus 1A (touch-off). As the user further touches candidate image 212 in image selection region 210 which corresponds to symbol 202AA in this state, symbol 202AA can be emphasized.

Figure 11A:
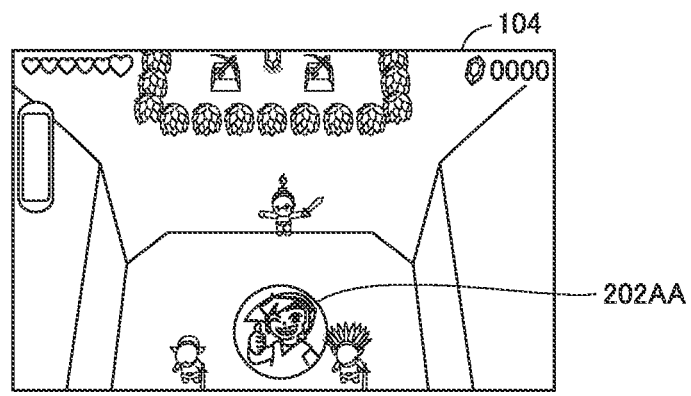
Figure 11B:
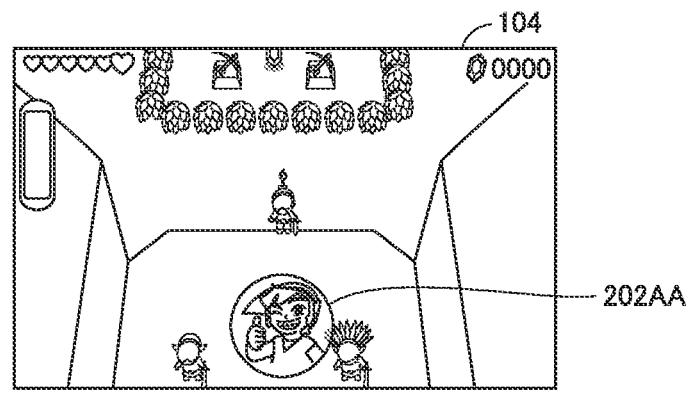
Figure 11C:
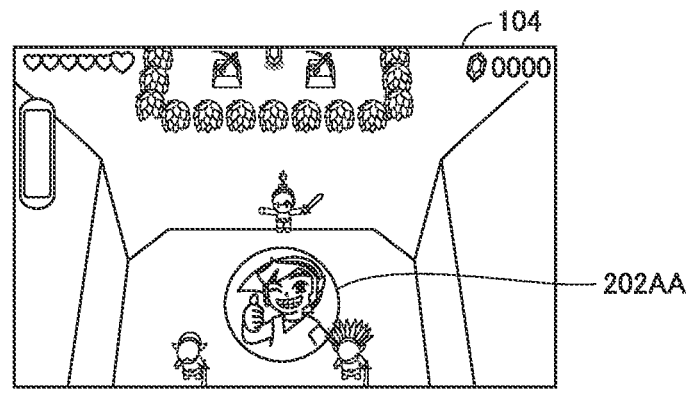

By way of example of such emphasized representation, FIGS. 11A to 11C each show a manner of representation in which symbol 202AA displayed in first display portion 104 gradually increases in size in accordance with the number of times of touching by the user onto corresponding candidate image 212 in image selection region 210. Namely, as the user repeatedly selects the same candidate image 212, corresponding symbol 202AA changes to be greater in size. As symbol 202AA gradually increases in size, a user's own intention can be conveyed in a more emphasized manner to a counterpart. The size of a symbol may be changed at a degree in accordance with a duration of touching until touch-off.

Figure 12A:
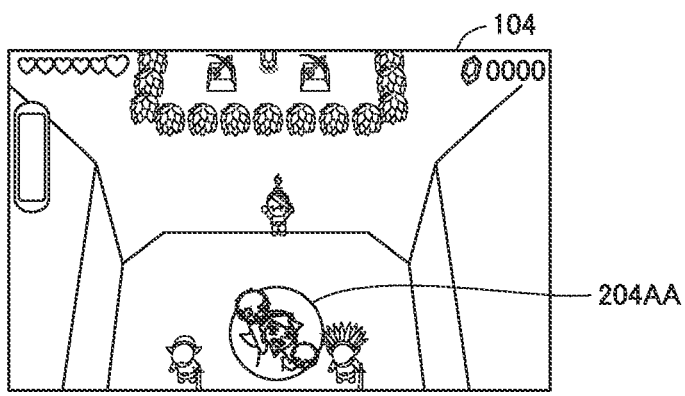
Figure 12B:
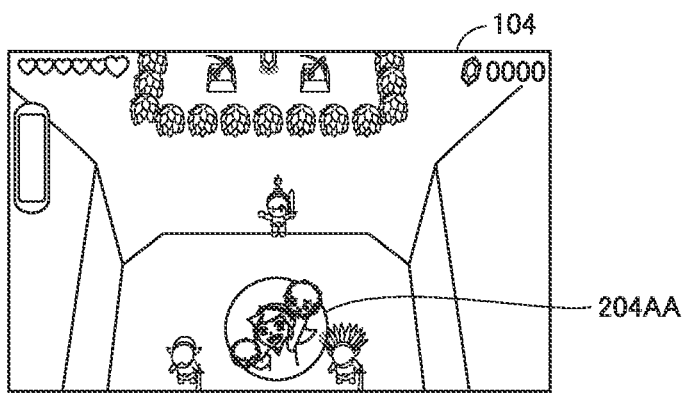

By way of another example of such emphasized representation, FIGS. 12A and 12B each show a manner of representation in which a content (an image) of symbol 204AA displayed in first display portion 104 switches in accordance with the number of times of touching by the user onto corresponding candidate image 214 in image selection region 210. Namely, as the user repeatedly selects the same candidate image 214, a content of display (an image) of corresponding symbol 204AA successively switches. As the content (image) of symbol 204AA switches, a user's own intention can be conveyed in a more emphasized manner to a counterpart.

By providing such emphasized representation, communication with a counterpart can be more expressive.

[E. Display Position]

Though an example in which a symbol is displayed at a predetermined position has been described above, a corresponding symbol may be displayed in association with display positions of characters 220A to 220C.

Referring to FIG. 13, characters 220A to 220C operated by respective users are displayed in first display portion 104, and when any user performs an operation to fully display a symbol, that symbol may be displayed in the vicinity of the display position of the character operated by that user.

For example, as shown in FIG. 13A, when a user who operates information processing apparatus 1A has a symbol fully displayed, that symbol 216AA is arranged at a position next to character 220A.

Similarly, as shown in FIG. 13B, when a user who operates information processing apparatus 1B has a symbol fully displayed, that symbol 216BA is arranged at a position next to character 220B, and when a user who operates information processing apparatus 1C has a symbol fully displayed, that symbol 216CA is arranged at a position next to a character 220C.

When no character is present in a screen, a symbol may be displayed at an end portion of the screen in accordance with a direction in which the character is present.

As described above, a character operated by each user may be displayed in a virtual game field and a symbol may be displayed at a position in accordance with a position of each character. By adopting such processing, when each user performs an operation to fully display a symbol, that symbol is displayed at a position associated with the character operated by that user. Thus, from which user a message originates can more easily be known.

[F. Calling Representation]

In game processing performed in information processing apparatus 1 according to the present embodiment, a game proceeds as a plurality of users cooperate with one another. Here, each user can freely operate a character in a common virtual game field. Therefore, there is also a case that some of members who participate in the game processing are in another game field or stage, a case that some members are present at a remote location in a lobby before participation in the game processing, or a case that a virtual game field is not displayed in a lobby or a game space (for example, when an item screen is displayed). In that case, such a function that all or some of remaining members call other members who are present in another game field or stage may be incorporated, so that all the members can have the game proceed in cooperation with one another. A symbol as described above may be used in this calling. Processing for such calling representation will be described below.

Figure 14:
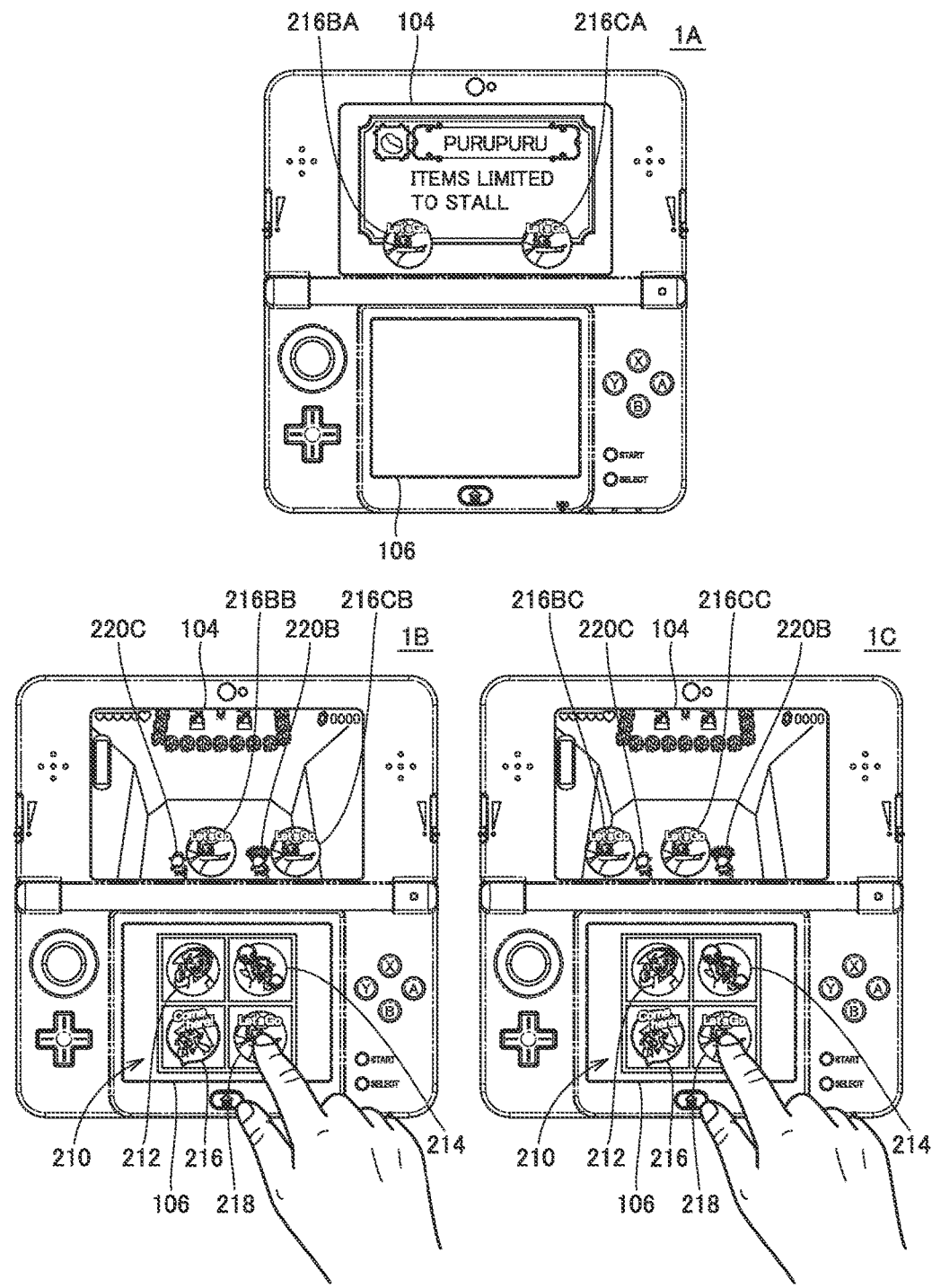
FIG. 14 shows an exemplary illustrative non-limiting drawing illustrating calling representation in the information processing apparatus according to the present embodiment.

FIG. 14 shows a state that three users of information processing apparatuses 1A to 1C make up a team, and thereafter the user of information processing apparatus 1A accesses a screen for checking details of an item (a pictorial book), whereas other users are present in a virtual game field. Namely, a common virtual game field is not displayed on information processing apparatus 1A. It is assumed that each of the users of information processing apparatus 1B and information processing apparatus 1C has selected candidate image 218 among the plurality of candidate images 212, 214, 216, and 218 in this state.

Then, symbol 216BA representing calling from the user of information processing apparatus 1B is displayed in first display portion 104 of information processing apparatus 1A. Similarly, symbol 216CA representing calling from the user of information processing apparatus 1C is displayed in first display portion 104 of information processing apparatus 1A. As described previously, symbols 216BB and 216CB are displayed (fully displayed) in first display portion 104 of information processing apparatus 1B. Symbol 216BB is a symbol fully displayed as the user performs a touch operation onto image selection region 210 of information processing apparatus 1B, and symbol 216CB is a symbol fully displayed as the user performs a touch operation onto image selection region 210 of information processing apparatus 1C. Symbols 216CC and 216BC are displayed (fully displayed) in first display portion 104 of information processing apparatus 1C.

As such symbols 216BA and 216CA are displayed, the user of information processing apparatus 1A can immediately know that other members desire the game to proceed. Then, as the user of information processing apparatus 1A performs an operation to return to the common virtual game field, start or resumption of progress of the game by all members can quickly be made. By adopting such a calling representation function, such stress as waiting for other members can be lessened in a game which proceeds as a plurality of users cooperate with one another.

Though a state after other members have already gone to the virtual game field as shown in FIG. 14 has been shown, the calling function may be used for calling within a lobby before a team is made up and the team goes to the virtual game field.

[G. Processing Procedure]

A processing procedure in information processing apparatus 1 according to the present embodiment will be described with reference to FIG. 15. Each step shown in FIG. 15 is typically implemented as processor 110 executes information processing program 114 (both of which are in FIG. 1).

When the user indicates start of game processing or power of information processing apparatus 1 is turned on, execution of the processing shown in FIG. 15 is started.

Information processing apparatus 1 displays a message inviting selection of information processing apparatus 1 itself inviting members who will participate in game processing or information processing apparatus 1 participating in game processing invited by any user (step S100).

When the information processing apparatus itself to invite members who will participate in game processing is selected ("invite members" in step S100), information processing apparatus 1 sends a command for inviting members who will participate in the game processing (step S102). This command may be transmitted from near field wireless communication portion 120 (FIG. 1) to information processing apparatus 1 which may be present nearby, or may be transmitted from network communication portion 122 (FIG. 1) to another information processing apparatus 1 or a server device over the network. Then, information processing apparatus 1 determines whether or not a participation request from other information processing apparatuses 1 has been received (step S104). When a participation request from other information processing apparatuses 1 has not been received (NO in step S104), processing in step S104 is repeated.

When a participation request from other information processing apparatuses 1 has been received (YES in step S104), information processing apparatus 1 determines a participating member (step S106). Then, progress of game processing is started (step S110).

The processing in steps S104 and S106 may be repeated until a predetermined number of users gather. Alternatively, when a predetermined number of users did not gather within a predetermined period, the processing in steps S104 and S106 may be aborted.

When participation in game processing invited by any user ("participation in game processing" in step S100) is selected, information processing apparatus 1 transmits a participation request to information processing apparatus 1 which has been inviting a member (step S108). Then, progress of game processing is started (step S110).

After progress of the game processing is started, information processing apparatus 1 determines whether or not a touch onto second display portion 106 (the touch panel) has been detected (step S112). When no touch has been detected (NO in step S112), the processing in step S112 is repeated.

In contrast, when a touch has been detected (YES in step S112), information processing apparatus 1 determines whether or not the detected touch position is within a region of any candidate image (step S114). When the detected touch position is not in a region of any candidate image (NO in step S114), processing in step S118 is performed.

When the detected touch position is within a region of any candidate image (YES in step S114), information processing apparatus 1 has first display portion 104 provisionally display a symbol corresponding to a candidate image, in which region the touch position is located (step S116). In succession, information processing apparatus 1 determines whether or not the touch onto second display portion 106 (touch panel) continues (step S118).

When the touch onto second display portion 106 (touch panel) continues (YES in step S118), information processing apparatus 1 determines whether or not the detected touch position continues to be present within the region of the candidate image of interest (step S120).

When the detected touch position does not continue to be present within the region of the candidate image of interest (NO in step S120), information processing apparatus 1 cancels provisional representation of the symbol in first display portion 104 (step S122). Then, the processing in step S114 or later is repeated.

When the detected touch position continues to be present within the region of the candidate image of interest (YES in step S120), the processing in step S118 or later is repeated.

When a touch onto second display portion 106 (touch panel) no longer continues (NO in step S118), information processing apparatus 1 determines whether or not any symbol is provisionally displayed in first display portion 104 (step S124). When no symbol is provisionally displayed in first display portion 104 (NO in step S124), processing in step S136 is performed.

When any symbol is provisionally displayed in first display portion 104 (YES in step S124), information processing apparatus 1 has the provisionally displayed symbol fully displayed (step S126). In succession, information processing apparatus 1 determines whether or not a touch has been detected in a region of a candidate image corresponding to the fully displayed symbol (step S128). When a touch has been detected within the region of the candidate image corresponding to the fully displayed symbol (YES in step S128), information processing apparatus 1 has a manner of representation of the fully displayed symbol varied (step S130).

When no touch has been detected in the region of the candidate image corresponding to the fully displayed symbol (NO in step S128) or after step S130 is performed, information processing apparatus 1 maintains full representation of the symbol for a period during which a predetermined condition is satisfied. A condition for maintaining full representation of a symbol includes, for example, a predetermined period or until another symbol is provisionally displayed. Information processing apparatus 1 determines whether or not a predetermined condition for full representation has been satisfied (step S132). When a predetermined condition for full representation has been satisfied (YES in step S132), the processing in step S130 or later is repeated.

In contrast, when a predetermined condition for full representation has not been satisfied (NO in step S132), information processing apparatus 1 cancels full representation of the symbol in first display portion 104 (step S134).

Information processing apparatus 1 determines whether or not a command for a symbol to fully be displayed in first display portion 104 has been received from another information processing apparatus 1 (step S136). When a command for a symbol to fully be displayed in first display portion 104 has been received from another information processing apparatus 1 (YES in step S136), information processing apparatus 1 has first display portion 104 fully display a symbol for which the command has been received (step S138).

When a command for a symbol to fully be displayed in first display portion 104 has not been received from another information processing apparatus 1 (NO in step S136) or after step S138 is performed, information processing apparatus 1 determines whether or not end of the game processing has been indicated (step S140).

When end of the game processing has not been indicated (NO in step S140), the processing in step S112 or later is repeated. When end of the game processing is indicated (YES in step S140), the process ends.

[H. Advantage]

Information processing apparatus 1 and a plurality of information processing systems according to the present embodiment can have a symbol for communication among users displayed on one another. When a symbol is selected, the symbol is provisionally displayed so as to facilitate selection by a user, and when full representation is indicated, other users who perform the same game processing are notified of the selected symbol. Thus, by provisionally displaying a selected symbol while the symbol is selected, while interference with display of a virtual game field in which game processing is performed is avoided as much as possible, a symbol can reliably be selected.

Furthermore, a fully displayed symbol can be given motion or variation. Thus, in addition to the meaning of each symbol, a manner of representation can be various, so that more expressive communication can be realized without interference with progress of a game.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An information processing system, comprising:
 a first information processing apparatus, comprising:
  an input device configured to accept an operation by a user,
  a display,
  communication circuitry, and
  processing circuitry including at least one processor, the processing circuitry configured to process data in association with the input device, the communication circuitry, and the display; and
 a second information processing apparatus, comprising:
  an input device configured to accept an operation by a user,
  a display,
  communication circuitry, and
  processing circuitry including at least one processor, the processing circuitry configured to process data in association with the input device, the communication circuitry, and the display,
 the first information processing apparatus configured to:
  in response to a first input to the input device, cause display of a first image corresponding to the first input in a first manner of representation within a display area of the display of the first information processing apparatus, and
  in response to a second input following the first input to the input device, cause display of the first image in a second manner of representation different from the first manner of representation within the display area of the first information processing apparatus and, using the communication circuitry of the first information processing apparatus, cause display of the first image in the second manner of representation within the display area of the second information processing apparatus, wherein
 the input device includes a touch panel,
 the first input includes a touch-on operation onto the touch panel, and
 the second input includes a touch-off operation from the touch panel.

2. The information processing system according to claim 1, wherein
 the first manner of representation is displayed at a first visibility level and the second manner of representation is displayed at a second visibility level.

3. The information processing system according to claim 2, wherein
 in the first manner of representation, a part of the first image is displayed, and in the second manner of representation, entirety of the first image is displayed.

4. The information processing system according to claim 3, wherein
the displayed first image moves toward a central portion of the display area to change from the first manner of representation to the second manner of representation.

5. The information processing system according to claim 2, wherein
in the first manner of representation, the first image is displayed translucently, and
in the second manner of representation, the first image is displayed opaquely.

6. The information processing system according to claim 1, wherein
a second image corresponding to a third input to the input device of the second information processing apparatus is displayed in at least the display area of the first information processing apparatus, together with the first image, in response to an input from the second information processing apparatus.

7. The information processing system according to claim 6, wherein
in the display area of the display of the first information processing apparatus, an image corresponding to an input to the input device of the first information processing apparatus and an image corresponding to an input to the input device of the second information processing apparatus are displayed, and
in the display area of the display of the second information processing apparatus, an image corresponding to an input to the input device of the first information processing apparatus and an image corresponding to an input to the input device of the second information processing apparatus are displayed.

8. The information processing system according to claim 1, wherein
the display of at least the first information processing apparatus includes an input area for accepting the first and second inputs, separately from the display area of the first information processing apparatus.

9. The information processing system according to claim 8, wherein
a plurality of candidate images are displayed as aligned in the input area, and
which candidate image has been selected from among the plurality of candidate images is determined as the first input.

10. The information processing system according to claim 9, wherein an image to be displayed in the display area is switched, in accordance with the candidate image selected from among the plurality of candidate images, while the effective first input continues.

11. The information processing system according to claim 8, wherein
the display area and the input area are arranged in displays different from each other.

12. An information processing apparatus, comprising:
an input device which accepts an operation by a user;
a display;
a communication device configured to communicate with another information processing apparatus; and
processing circuitry including at least one processor, the processing circuitry configured to process data in association with the input device, display, and communication device, the processing circuitry further configured to:
in response to a first input to the input device, cause display of a first image corresponding to the first input in a first manner of representation within a display area of the display of the information processing apparatus; and
in response to a second input following the first input to the input device, cause display of the first image in a second manner of representation different from the first manner of representation within the display area of the information processing apparatus and, using the communication device, cause display of the first image in the second manner of representation within a display area of the another information processing apparatus, wherein
the input device includes a touch panel,
the first input includes a touch-on operation onto the touch panel, and
the second input includes a touch-off operation from the touch panel.

13. A non-transitory storage medium encoded with a computer readable information processing program executed by an information processing apparatus, the information processing apparatus comprising an input device which accepts an operation by a user, a display, and a communication device configured to communicate with another information processing apparatus, the information processing program causing the information processing apparatus to:
in response to a first input to the input device, cause display of a first image corresponding to the first input in a first manner of representation within a display area of the display of the information processing apparatus; and
in response to a second input following the first input to the input device, cause display of the first image in a second manner of representation different from the first manner of representation within the display area of the information processing apparatus and, using the communication device, cause display of the first image in the second manner of representation within a display area of the another information processing apparatus, wherein
the input device includes a touch panel,
the first input includes a touch-on operation onto the touch panel, and
the second input includes a touch-off operation from the touch panel.

14. An information processing method performed between at least first and second information processing apparatuses, each of the at least first and second information processing apparatuses including an input device which accepts an operation by a user, communication circuitry, and a display, the information processing method comprising:
in response to a first input to the input device of the first information processing apparatus, causing display of a first image corresponding to the first input in a first manner of representation within a display area of the display of the first information processing apparatus; and
in response to a second input following the first input to the input device of the first information processing apparatus, causing display of the first image in a second manner of representation different from the first manner of representation within the display area of the first information processing apparatus and, using the communication circuitry of the first information processing apparatus, cause display of the first image in the second manner of representation within the display area of the second information processing apparatus, wherein the input device includes a touch panel, the first input includes a touch-on operation onto the touch panel, and the second input includes a touch-off operation from the touch panel.

15. The information processing system according to claim 1, wherein as the first input is maintained within a first area of the input device, the first image is displayed in the first manner within the display area of the first information processing apparatus, and as the first input transitions to the second input in a second area of the input device, the first image is displayed in the second manner within the display area of each of the at least first and second information processing apparatuses.

16. The information processing system according to claim 1, wherein the first manner of representation is provisional representation and the second manner of representation is full representation.

* * * * *